Aug. 13, 1929.  J. L. DRAKE  1,724,261
SHEET GLASS CUTTING APPARATUS
Filed April 7, 1927
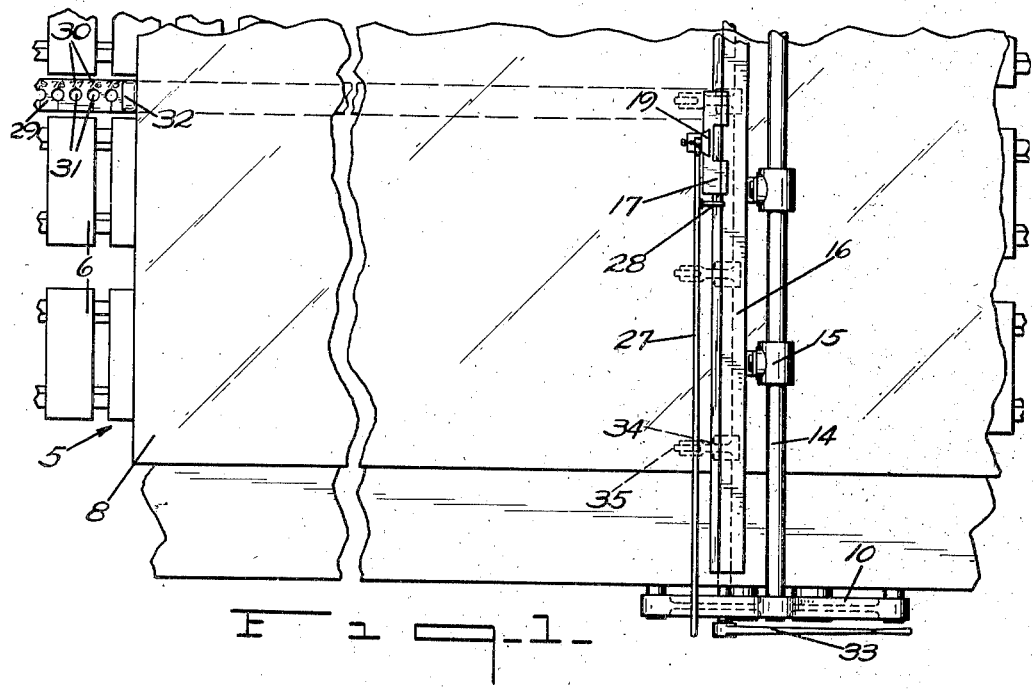
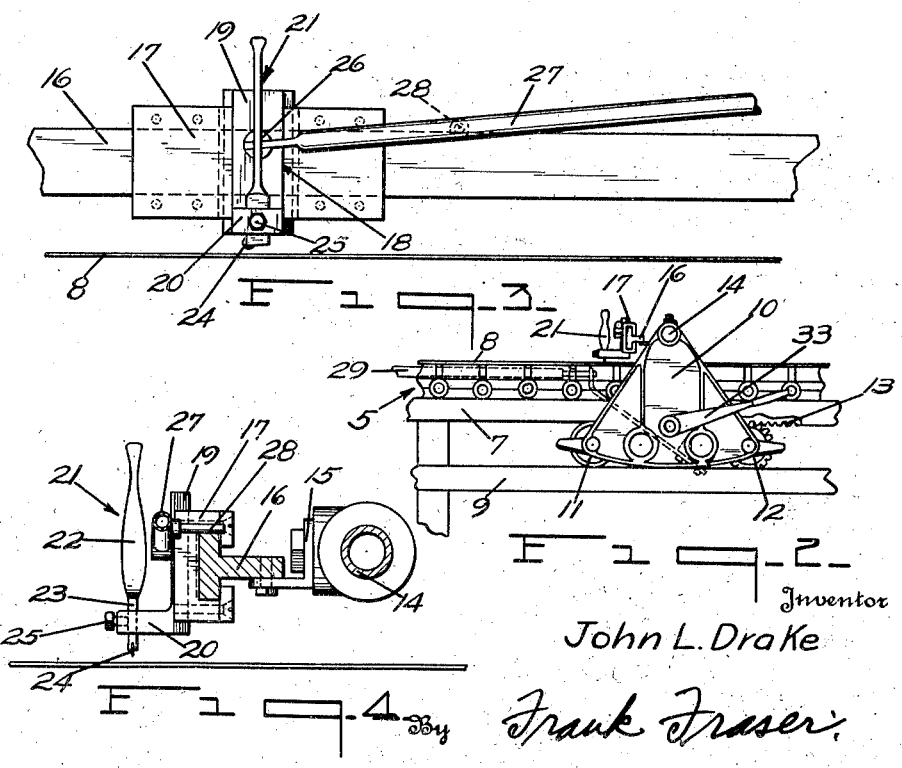
Inventor
John L. Drake
By Frank Fraser
Attorney Patented Aug. 13, 1929.

1,724,261

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS-CUTTING APPARATUS.

Application filed April 7, 1927. Serial No. 181,740.

The present invention relates to sheet glass cutting apparatus.

An important object of the invention is to provide an apparatus adapted for use in accurately separating a continuous ribbon of glass into sheet lengths.

Another object of the invention is to provide an apparatus of this nature wherein a continuous ribbon of glass can be scored transversely to facilitate separation of the ribbon into suitable sheet lengths, each score being parallel to the preceding score.

Another object of the invention is to provide an apparatus of this nature, including means for supporting a moving ribbon of glass, the apparatus including means adapted for movement with the sheet, and said means carrying a scoring tool which may be moved into and out of operative position, the scoring tool being movable transversely of the sheet in a predetermined path to score the same.

A further object of the invention is to provide an apparatus of this nature, including means for supporting a moving ribbon of glass, and scoring tool carrying means extending across the sheet, the scoring tool being movable vertically independently of said carrying means.

A still further object of the invention is to provide in cutting apparatus of this nature, means for supporting a moving ribbon of glass, a cutter guide extending across the sheet, a cutter carried by said cutter guide, and means for moving said cutter transversely of the sheet to score the same and for automatically raising the cutter out of engagement with the glass and for holding it in inoperative position.

Other objects and advantages of the invention will become more apparent during the course of the following description when taken in connection with the accompanying drawings.

In the drawings wherein like numerals are employed to designate like parts throughout the same, Fig. 1 is a top plan view of cutting apparatus constructed in accordance with the present invention, Fig. 2 is a side elevation thereof, Fig. 3 is a front elevation of the scoring tool and support therefor, and Fig. 4 is an enlarged detail of the scoring tool and support therefor.

This invention is particularly well adapted for use in connection with the Colburn type of sheet glass drawing apparatus wherein the sheet of glass is drawn and deflected in a manner that it is passed horizontally through a leer and out onto a cutting table, although it is, of course not necessarily restricted to such a type of machine.

It has been customary in the past to receive the sheet, as it leaves the leer, upon a movable table where the operator draws a scoring tool across the sheet transversely to separate it into suitable lengths. Due to the fact that the sheet is comparatively wide and that it is moving constantly, it is practically impossible for the operator to make free hand cuts that are accurate. Thus, it is necessary to cut each sheet considerably longer than is necessary to permit squaring up in the cutting room where the sheet is separated into commercial sizes. The loss of production due to this one cause is considerable.

The present invention has been designed to permit accurate cuts so that the ribbon of glass can be cut transversely either to size, or substantially to size. In some cases it may be found desirable to leave a relatively small margin so that the sheet can be trimmed in the cutting room.

In the drawing, the cutting table, designated in its entirety by the numeral 5, comprises a plurality of preferably wooden blocks 6 pivotally connected together in an endless belt formation. As shown in Fig. 1, the wooden blocks 6 are arranged in spaced rows, and the endless table, adapted to be driven in any suitable manner, is supported in its upper horizontal run upon the rails 7.

Disposed at either side of the table is a rail 9 adapted to support a carriage 10 supported on the rails by means of rollers 11. A pinion 12 carried by each carriage is adapted for engagement with a rack bar 13. By using a rack bar and pinion arrangement at both ends of the cutting means, the guide member and breaker arms to be hereinafter described are moved the same distance at both ends, thus preventing an uneven cut being made.

Arranged transversely across the sheet and connecting the carriages 10 at the opposite sides of the table is a shaft 14 carrying the brackets 15, which in turn support the cutter guide bar 16, said bar being T-shaped in cross section as shown in Fig. 4. The guide bar 16 is likewise mounted transversely of the sheet of glass and is adapted to slidably support the cutter carrying member 17, which is provided intermediate its ends with a vertically undercut groove 18 within which is slidably received the cutter holder 19 formed at its lower end with a forwardly directed extension or foot 20 which is adapted to support the cutter or scoring tool 21. This cutter or scoring tool may be of any conventional or preferred construction but has been shown, for the purpose of illustration, as being of the hand type now in common use. This type of cutter comprises in its construction a handle 22 extending from the head 23 which carries at its lower end the cutting wheel or tool 24. The head 23 is adapted to be passed vertically through an opening or slot formed in the extension 20 and secured in position by means of a set screw 24.

The cutter holder 19 has pivoted thereto as at 26, one end of the handle or operating lever 27 whereby the cutter carrier 17, cutter holder 19 and cutter 21 may be moved transversely across the sheet. The lever 27 is provided at a desired location with a lateral projection or pin 28 which is adapted to rest upon the top of the guide bar 16. This projection or pin 28 acts as a fulcrum for the said lever 27. The portion of the lever outwardly of the pin 28 is adapted to act as a counterweight to balance the holder 19 and cutter 21 so that upon the release of the lever by the operator, the cutter will be automatically raised out of engagement with the glass and held in this position as shown in Fig. 3.

Extending from the carriage 10 and adapted to lie beneath the sheet 8 is a measuring bar or stick 29 arranged between adjacent rows of blocks 6 so that it in no way interferes with the support of the sheet 8. The measuring bar or stick 29 is calibrated as at 30 with the numbers beginning at the carriage and extending outwardly towards the end of the stick. The measuring bar is further provided with a plurality of openings 31, one for and opposite each of the numbers 30, and adapted for individual and selective engagement within the said openings 30 is a block 32.

In operation, the cutting tool 21 is normally held in an inoperative position by means of the lever 27 which acts as a counterweight as hereinabove described. The block 32 is then inserted within the proper opening 31 according to the length of sheet to be cut. Since the sheet is continually moving, the end thereof bearing against the block 32, as shown in Fig. 1, will cause the carriage and associated parts to be moved with the sheet. The handle 27 may then be grasped by the operator and raised so that the cutting wheel 24 will be lowered into contact with the sheet of glass 8, after which the said cutting tool is moved transversely across the sheet to score the same. Upon the release of the handle 27 by the operator, the weight of the same outwardly of the pin 28 is such that it will automatically act to raise the cutter out of engagement with the glass and hold it in such position as set forth above.

After the sheet has been scored transversely as described, the lever 33 is pushed downwardly, which action raises the arms 34 into contact with the sheet and raises the same from the table sufficiently to cause a separation of the sheet along the score line. Rollers 35 may be provided on the ends of the arms 34 so that they contact with said sheet during the breaking operation.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass cutting apparatus, means for supporting a continuously moving sheet, cutter guiding means extending across the sheet and movable therewith, a cutter carried by said guiding means and movable vertically towards and away from said sheet independently of said guiding means, and means for counterbalancing the cutter to automatically raise the same away from the glass and hold it in inoperative position.

2. In sheet glass cutting apparatus, means for supporting a continuously moving sheet, cutter guiding means extending across the sheet and movable therewith, a cutter carried by said guiding means and movable vertically towards and away from said sheet independently of said guiding means, and a lever for moving the cutter across the sheet, said lever acting as a counterweight to automatically raise the cutter away from the glass and hold it in inoperative position upon the release of said lever by the operator.

3. In sheet glass cutting apparatus, means for supporting a continuously moving sheet, cutter guiding means extending across the sheet and movable therewith, a cutter slidably mounted on said guiding means and movable into and out of engagement with said sheet, and means for counterbalancing the cutter to automatically move it out of engagement with the glass and hold it in such position.

4. In sheet glass cutting apparatus, a table for a continuously moving sheet, a cutter guide extending across the sheet and movable therewith, a cutter carrier slidable on said cutter guide, a cutter holder vertically movable in said cutter carrier, a cutter carried by said holder, and a lever connected with said holder whereby the cutter may be drawn across the sheet, said lever acting as a counterweight to automatically raise the cutter away from the glass and hold it in such a position when said lever is released by the operator.

5. In sheet glass cutting apparatus, a table for the sheet, a cutter guide extending across the sheet, a cutter holder slidable on said guide, a cutter carried by said holder and movable vertically into and out of engagement with the sheet, and a lever connected at one end to said holder and having a lateral projection intermediate its ends adapted to rest upon said cutter guide, the weight of the lever outwardly of said lateral projection being sufficient to counterbalance the cutter holder and cutter to automatically raise said cutter out of engagement with said sheet and to hold it in such a position upon the release of said lever by the operator.

6. In sheet glass cutting apparatus, a table for supporting a continuously moving sheet, a cutter guide extending across the sheet and movable therewith, a cutter carrying member slidably mounted on the cutter guide and movable across the sheet, a cutter holder mounted in the cutter carrier for vertical movement with respect thereto, a cutter carried by said holder and movable into and out of engagement with the sheet, and a lever connected at one end to said holder and having means intermediate its ends adapted to rest upon said cutter guide, the weight of said lever outwardly of said means being sufficient to counter-balance the cutter holder and cutter to automatically raise the cutter out of engagement with said sheet and to hold it in such position upon the release of said lever by the operator.

7. In sheet glass cutting apparatus, a table for the sheet, a cutter guide extending across the sheet, a cutter carrying member slidably mounted upon the cutter guide, a cutter holder carried by the cutter carrier and vertically movable with respect thereto, a cutter carried by said holder and movable vertically therewith into and out of engagement with the sheet, and a lever connected at one end to said holder and having means intermediate its ends engaging the cutter guide so that the said lever may be rocked about said means to raise and lower the cutter holder and cutter with respect to the sheet.

8. In sheet glass cutting apparatus, a movable table for supporting a continuously moving sheet, a cutter guide extending across the sheet and movable therewith, a cutter carrying member slidably mounted on the cutter guide and movable across the sheet, a cutter holder carried by the cutter carrier and vertically movable with respect thereto, a cutter carried by said holder and movable vertically into and out of engagement with the sheet, a lever connected at one end to said holder, and a fulcrum carried by the lever intermediate its ends and adapted to engage the cutter guide so that upon rocking of the lever the cutter holder and cutter may be moved vertically with respect to the glass.

Signed at Toledo, in the county of Lucas and State of Ohio, this 4th day of April, 1927.

JOHN L. DRAKE.